(12) United States Patent
Bennett

(10) Patent No.: US 7,137,636 B2
(45) Date of Patent: Nov. 21, 2006

(54) VEHICLE SUSPENSION LIFT SPACER

(76) Inventor: Kyle J. Bennett, 1510 Carpenter's Campground Rd., Maryville, TN (US) 37803

( * ) Notice: Subject to any disclaimer, the term of this patent is extended or adjusted under 35 U.S.C. 154(b) by 410 days.

(21) Appl. No.: 10/821,998

(22) Filed: Apr. 12, 2004

(65) Prior Publication Data
US 2005/0225051 A1    Oct. 13, 2005

(51) Int. Cl.
B60G 15/00    (2006.01)
(52) U.S. Cl. .................. 280/124.147; 280/124.155
(58) Field of Classification Search ......... 280/124.147, 280/124.155, 124.179, 124.146; 267/287
See application file for complete search history.

(56) References Cited

U.S. PATENT DOCUMENTS

| | | | |
|---|---|---|---|
| 3,326,545 A * | 6/1967 | Bache .............. | 267/287 |
| 3,830,482 A | 8/1974 | Norris | |
| 4,830,348 A * | 5/1989 | Seyler .............. | 267/166 |
| 5,246,215 A * | 9/1993 | Takamura et al. ........ | 267/170 |
| 6,149,171 A | 11/2000 | Bono et al. | |
| 6,188,039 B1 | 2/2001 | Gass | |
| 6,457,704 B1 * | 10/2002 | Van Eerden et al. ........ | 267/179 |
| 6,481,079 B1 | 11/2002 | Newhan | |
| 6,543,828 B1 | 4/2003 | Gass | |
| 6,752,408 B1 * | 6/2004 | La ................ | 280/124.135 |
| 2002/0109328 A1 * | 8/2002 | Remmert et al. ..... | 280/124.147 |
| 2002/0171223 A1 * | 11/2002 | Chan .............. | 280/124.179 |

OTHER PUBLICATIONS

Internet Website http://Performancelifts.com (illustrates Daystar 02-24 Ram 1500 2" lift spacer.)
Internet Website http://www.daystarweb.com Daystar Products International Inc., Phoenix, AZ.
Internet Website http://rough.roughcountry.com of Rough Country, Heckethorn Products, Inc.

* cited by examiner

Primary Examiner—David R. Dunn
Assistant Examiner—Tiffany L. Webb
(74) Attorney, Agent, or Firm—Richard C. Litman

(57) ABSTRACT

The vehicle suspension lift spacer of the present invention fits between the coil spring and the upper spring receiver of the front suspension. It is made by welding stock flat and cylinder stock material, making it cheap to make and sufficiently rugged for the desired use. The lift spacer is generally cylindrical, having a common axis with an axially mounted shock absorber. The lift spacer has a flat ring upper attachment plate having upward-spaced bolts for attachment through the upper coil spring receiver and shock tower mounts. A lift member is a cylindrical section welded coaxially to the underside of the upper attachment plate and determines the amount of lift of the lift spacer. A flat ring bearing is coaxially welded to the cylindrical lift member for bearing against the coil spring. A cylindrical guide member is welded to the lower side of the bearing plate.

19 Claims, 5 Drawing Sheets

VEHICLE SUSPENSION LIFT SPACER

BACKGROUND OF THE INVENTION

1. Field of the Invention

The present invention relates to vehicle suspensions. More particularly, the present invention relates to suspension lift spacers for use with coil springs.

2. Description of the Related Art

The use of vehicles for off-road travel is popular to reach remote camping, fishing, and hunting locations and has developed into a sport in itself. It is common to employ spacers to the suspension to lift the vehicle relative to the ground so as to increase its clearance. This allows the use of larger tires and to travel over rugged terrain. The use of standard pickup trucks and the like for off-road adventure driving is common, however, their suspensions are not originally designed for such use. The use of suspension lift spacers in the suspensions improves their utility for off-road use by increasing ground clearance for rough terrain. Such spacers must be designed for each particular truck make and model. The Dodge Ram 1500 truck, for example, has coil springs and thus requires a spacer fitting between the coil spring and the upper or lower spring receiver and must accommodate an axial shock absorber. Lift spacers are presently available, typically in 2" and 3" lift sizes, however known spacers require special casting and/or expensive machining. It would be desirable to provide such a suspension lift which is simple in design, made from readily available plate and cylinder stock, requires no expensive machining, and is sufficiently rugged for its intended use.

U.S. Pat. No. 3,830,482, issued Aug. 20, 1974, to Norris describes an adjustable coil spring lifter to provide lift or restore loaded spring height.

U.S. Pat. No. 6,149,171, issued Nov. 21, 2000, to Bono et al. describes a coil spring isolator for a vehicle suspension.

U.S. Pat. No. 6,188,039, issued Feb. 13, 2001, to Gass, describes a projection welded panel spacer and the method for making the spacer by welding flats to tube stock.

U.S. Pat. No. 6,481,071 B1, issued Nov. 19, 2002, to Newhan, describes a suspension kit to raise a vehicle front end.

U.S. Pat. No. 6,543,828 B1, issued Apr. 8, 2003, to Gass, describes a welded panel spacer and method of making the spacer.

U.S. Pat. No. 6,642,471 B2, issued Nov. 4, 2003, to Imai et al., describes a method for welding steels including plate to cylindrical stock.

Internet Website http://Performancelifts.com describes a Daystar 02–24 Ram 1500 2" lift spacer.

Internet Website http://www.daystarweb.com describes front coil spring spacer kits for Dodge Ram 1500 suspensions.

Internet Website http://rough.roughcountry.com of Rough Country a division of Heckethorn Products, Inc. is a source for a coil spring spacer for Dodge Ram 1500 suspensions (See FIG. 5 of the instant application).

None of the above inventions and patents, taken either singly or in combination, is seen to describe the instant invention as claimed. Thus a vehicle suspension lift spacer for Dodge Ram 1500 trucks solving the aforementioned problems is desired.

SUMMARY OF THE INVENTION

The vehicle suspension lift spacer of the present invention is designed to fit between the upper end of the coil spring and the upper spring receiver of the front suspension of a Dodge Ram 1500 truck. It is made by cutting and welding stock flat and cylinder stock material, making it cheap to make and sufficiently rugged for the desired use. No special casting or machining is required. The lift spacer is generally cylindrical, having a central axis in common with the axially mounted shock absorber extending downward therethrough. The lift spacer has an upper attachment plate in the shape of a flat ring having equally spaced bolts extending upward for attachment through the upper coil spring receiver and shock tower mounts.

The lift member is a cylindrical section of appropriate length and is welded coaxially to the underside of the upper attachment plate. A bearing plate in the shape of a flat ring is coaxially welded to the lower edge of the cylindrical lift member for bearing against the upper end of the coil spring. A cylindrical guide member is welded to and coaxially depends from the lower side of the bearing plate to maintain the lift member properly placed relative to the outer coil spring and the inner shock absorber. The spacer may be provided in desired lengths, and typically 2" and 3" lengths. The desired length is obtained by selecting the length of the cylindrical section, the thickness of the upper attachment plate and bearing plate remaining a constant. The lift spacer may be made from steel or other appropriate material.

It is an aspect of the invention which provides improved elements and arrangements thereof for the purposes described which is inexpensive, dependable and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a coil spring suspension lift spacer for insertion between a coil spring and its upper receiver. The inventive lift spacer increases the clearance of the vehicle for off-road use. This lifts spacer is particularly useful in coil spring suspensions where the shock absorber extends axially through the coil spring.

Figure 1:
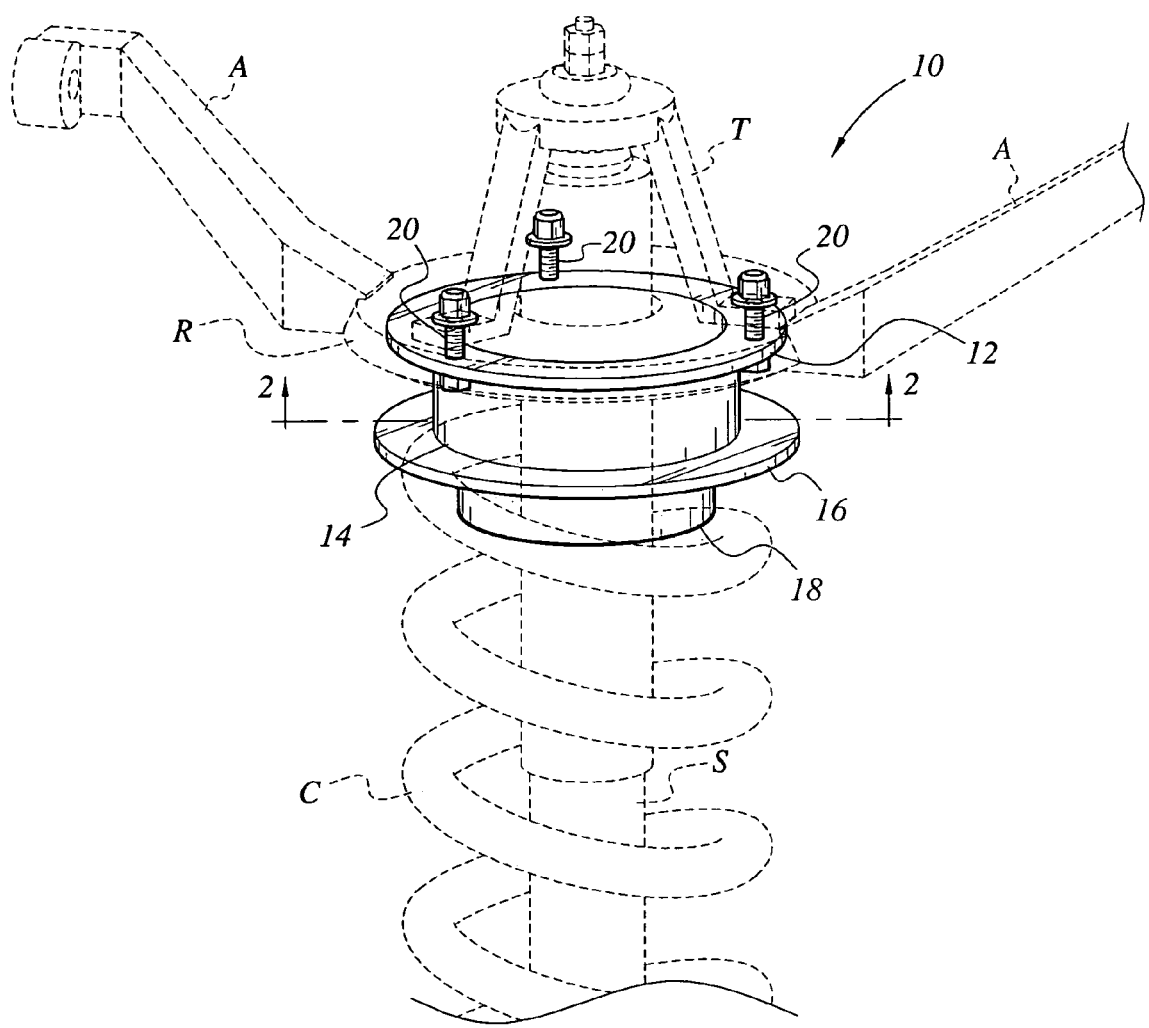
FIG. 1 is an environmental, perspective view of a suspension lift spacer according to the present invention.

Referring to FIG. 1, there is shown an environmental, perspective view of the coil spring suspension lift spacer referred to by reference number 10. Lift spacer 10 is integral and generally cylindrical in shape, defining a central axis, and includes an upper attachment plate 12 configured as a flat ring, a cylindrical lift member 14 depending from the attachment plate 12 defining the height of lift of the lift spacer 10, a bearing plate 16 configured as a flat ring and depending from the cylindrical lift member 14, and a cylindrical guide member 18 depending from bearing plate 16. Upper attachment plate 12 has a peripheral portion having three threaded securing bolts equally spaced around its circumference proximate the outer edge thereof and extending upward therefrom.

As shown in FIG. 1, coil spring C is vertically separated from coil receiver R by lift spacer 10, thus adding height to the suspension represented by vehicle suspension arms A. Generally, suspension arms A are permanently attached to coil receiver R by welding. A suspension tower T is in the general shape of a tripod and is generally bolted at its base to the upper side of coil receiver R proximate the periphery thereof. The suspension tower T provides an upper mount for shock absorber S. Shock absorber S extends axially downward through coil spring C and is mounted at the base thereof (not shown) in a known manner. With lift spacer 10 in place, upper attachment plate 12 bears against the lower surface of coil spring upper receiver R and bolts 20 act as studs and take the place of the original suspension bolts (not shown), extending upward through the existing bolt receiving bores of receiver R and the lower legs of shock tower T and are secured by washers 60 and nuts 62 (see FIG. 4). A ring-like rubber isolator (not shown) conforming to the underside of coil receiver R is supplied with the suspension to provide sound and vibration isolation from the coil spring C to the upper suspension. During installation of the inventive lift member, this rubber isolator may be placed between the top of the coil spring C and the bearing plate 16 (not shown) as desired to provide sound and vibration isolation from the lower suspension and spring to the inventive lift spacer 10.

Lift member 14 is a section of cylindrical pipe or steel stock, the length of which may be selected to determine the amount of lift added to the vehicle suspension. Bearing plate 16 bears against the upper end of coil spring C, performing the function of coil receiver R in the original suspension configuration. Guide member 18 extends axially downward in the annular space between coil spring 18 and shock absorber S to maintain lift spacer 10 in alignment with coil spring C while allowing the shock absorber S to extend therethrough.

Upper attachment plate 12 has a first outer diameter such as to fit within upper spring receiver R. Lift member 14 has a second outer diameter which is less than the first diameter defined by upper attachment plate 12 so as to provide clearance for installation of securing bolts 20. Bearing plate 16 has an outer diameter equal to or larger than the first outer diameter defined by said upper attachment plate 12. Guide member 18 has a fourth diameter less than the diameter of bearing plate 16 and is of such an outer diameter as to fit axially within coil spring C. Guide member 18, as well as the other components of the lift spacer 10 has an inner diameter at least sufficient to receive an axial shock absorber therethrough.

Figure 2:
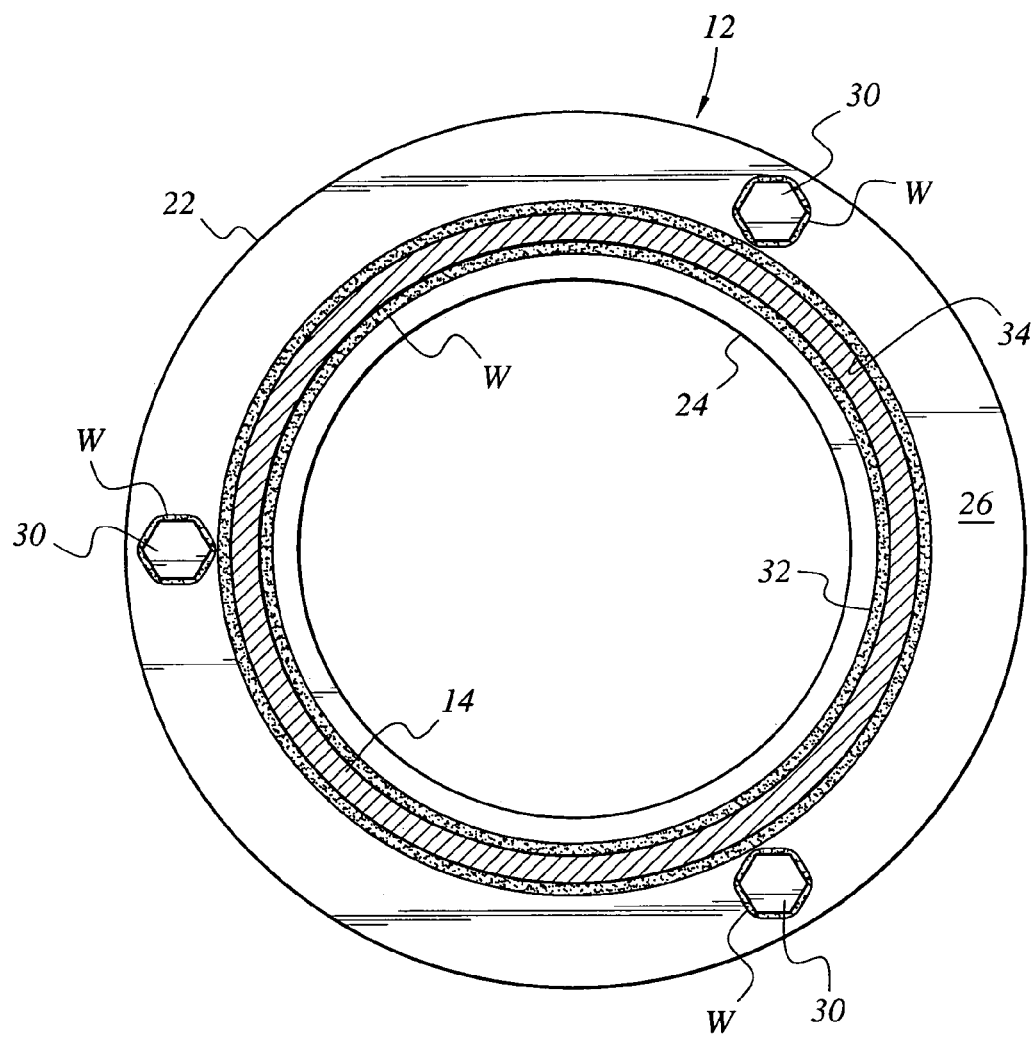
FIG. 2 is a section view drawn along lines 2—2 of FIG. 1.

Referring to FIG. 2, there is shown a sectional view through lift member 14 of vehicle suspension lift member 10 looking upward. Attachment plate 12 is in the form of a flat ring having an upper surface with outer edge 22 and an inner edge 24. Lift member 12 is a cylindrical segment having an upper edge and a lower edge and an outer surface 34 defining an outer diameter and an inner surface 32 defining an inner diameter. Lift member 12 is spaced outward from inner edge 24 of attachment plate 12 and is secured to its lower surface 26 by welding as illustrated by weld beads W. Bolt heads 30 of bolts 20 are welded in place to the lower surface 26 of the peripheral portion as illustrated by weld beads W. Bolts 20 are equally spaced around a peripheral portion of upper attachment member 12 proximate its outer edge 22 and extend upward from heads 30 through corresponding throughbores (see FIG. 4) for securing lift spacer 10 to coil spring upper receiver R and shock tower T (see FIG. 1).

Figure 3:
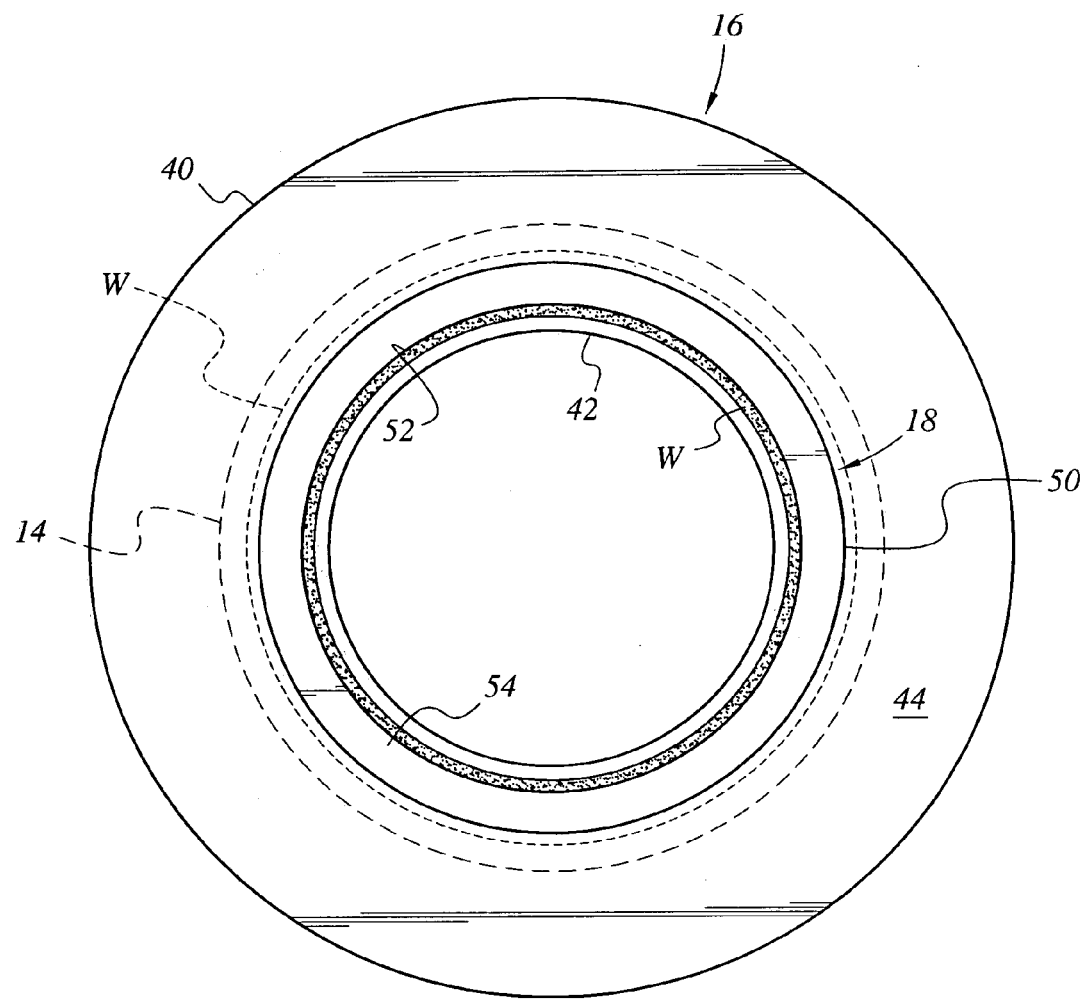
FIG. 3 is a bottom view of the suspension lift spacer of FIG. 1.

Referring to FIG. 3, there is shown a bottom view of vehicle suspension lift spacer 10 showing bearing plate 16 and guide member 18. Bearing plate 16 has a flat ring configuration and is mounted coaxially and depending from lift member 14 by welding as illustrated by weld bead W. Bearing plate 16 has an upper surface having an outer edge 40, defining an outer diameter, and an inner edge 42, defining an inner diameter thereof. Guide member 18 is mounted coaxially with bearing plate 16 by welding to its lower surface 44, as illustrated by weld bead W, proximate and spaced outward from inner edge 42. Guide member 18 has an upper edge and a lower edge and has an outer surface 50 defining and outer diameter and an inner surface 52 defining an inner diameter. The outer diameter of guide member 18 as defined by outer surface 50 is preferably about equal to or less than the inner diameter of lift member 14 and is axially mounted relative thereto. Guide member 14 is preferably of sufficient length to maintain the spacing of coil spring C and shock absorber S.

Figure 4:
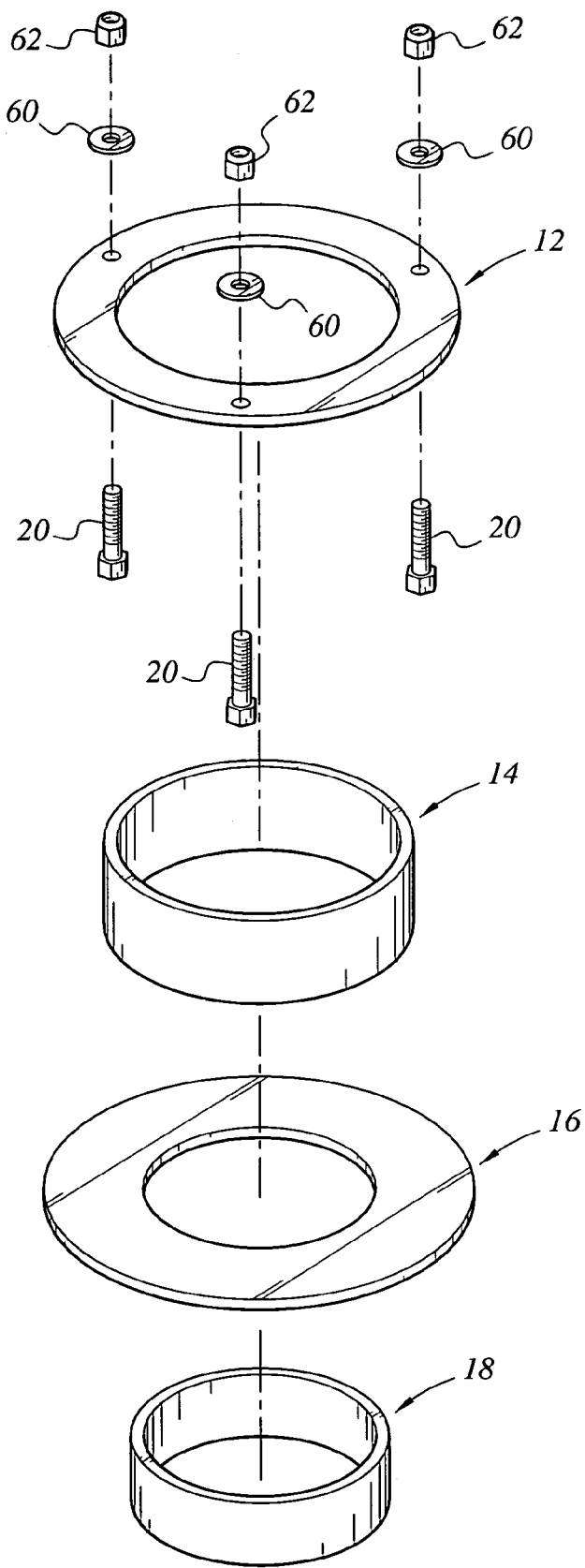
FIG. 4 is an exploded view of the suspension lift spacer of FIG. 1.

Referring to FIG. 4, there is shown an exploded view showing the upper attachment plate 12, lift member 14, bearing plate 16, and guide member 18 as axially aligned. Also shown are the securing bolts 20 as aligned with spaced throughbores in upper attachment plate 12 and having washers 60 and nuts 62. Although it is preferred that bolts 20 be welded to attachment plate 12 as shown in FIG. 2, they may be separately inserted when mounting lift spacer 10 in the vehicle suspension.

Figure 5:
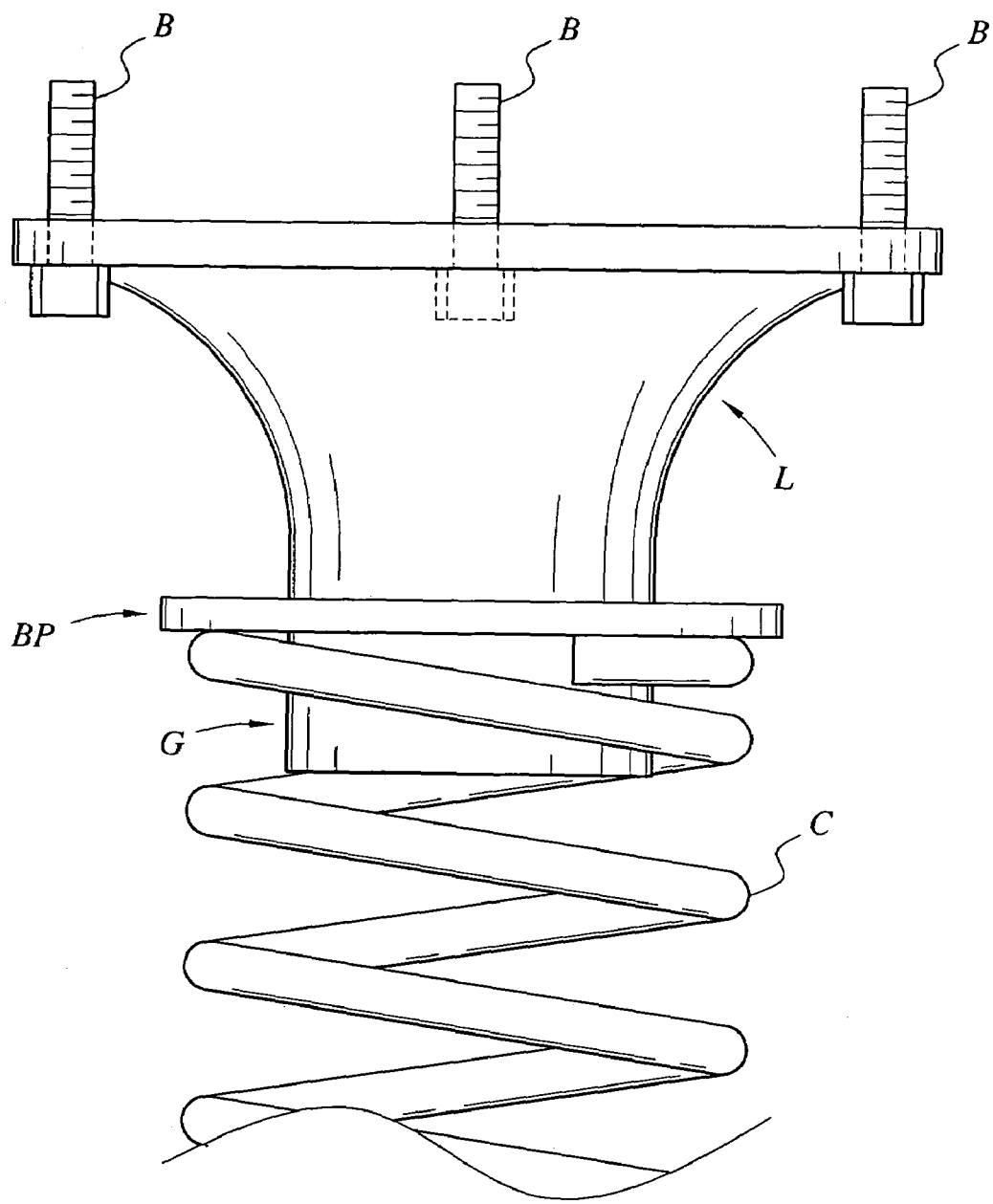
FIG. 5 is a prior art suspension lift spacer.

FIG. 5 shows an environmental elevation view of a prior art vehicle suspension lift spacer for coil springs. In this design, the lift spacer is generally cylindrical and the lift member L is made of cast iron, machined to form an integral unit, the wall curving upward and outward to form a ring for mounting securing bolts B. A bearing plate BP is welded to lift member L along the internal wall (not shown). A guide member G is welded to bearing plate BP along the internal wall (not shown). This vehicle suspension lift spacer is available for Dodge Ram 1500 trucks from the Rough Country, a division of Heckethorn Products, Inc., 1400 Morgan Road, Dyersburg, Tenn., having the Internet address http://rough.roughcountry.com.

The two flat rings for the upper attachment plate 12 and the bearing plate 16 of the lift spacer of the present invention are preferably laser cut from ¼" mild steel stock with an outer diameter of about 6½" and an inner diameter of from about 3" to about 3½" for passage of the shock absorber. The lift member and the guide member of the present invention are preferably cut from appropriate sized mild steel cylindrical stock, pipe, or tubing. The lift member 14 is cut from 3/16" wall thickness tubing. The length of the lift member is selected for the amount of lift desired, a 2" lift spacer requiring a 1½" lift member and a 3" lift spacer requiring a 2½" lift member. The guide member 18 is cut from ⅛" wall thickness tubing about 1⅜" in length and has an inner diameter of at least 3". The diameter of the lift member 18 is preferably greater than that of guide member 18 to impart maximum strength to the lift spacer assembly.

Welding may be carried out with a conventional welder. Assembly and welding is preferably carried out in an inverted fashion by axially aligning the lift member 14 on the lower side of attachment plate 14 and welding along the upper edge of lift member 14 on both inner and outer sides; axially aligning bearing plate 16 on the lower edge of lift member 14 and welding along the lift member lower edge on its inner side; and axially aligning guide member 18 on the lower surface 44 of bearing plate 16 and welding along the upper edge of inner and outer walls 52 and 50, respectively. The securing bolts 20 may then be inserted in the throughbores in the peripheral portion of attachment plate 12 and the heads 30 welded to the lower surface 26 of attachment plate 12. Welding of the material can be performed inside the cylindrical tubing or pipe, outside, or a combination of both.

It is to be understood that the present invention is not limited to the embodiments described above, but encompasses any and all embodiments within the scope of the following claims.

I claim:

1. A generally cylindrical lift spacer for a vehicle coil suspension, comprising:
    an upper attachment plate configured as a flat ring defining a central axis and having an outer edge defining an outer diameter, an inner edge defining an inner diameter, an upper surface, a lower surface and a securing bolt peripheral portion;
    a cylindrical lift member depending axially from said upper attachment plate and having upper and lower edges, an inner surface defining an inner diameter, and an outer surface defining an outer diameter spaced inward from said outer edge of said upper attachment plate so as to define a securing bolt peripheral portion of said upper attachment plate;
    a bearing plate depending axially from said cylindrical lift member and configured as a flat ring having an outer edge defining an outer diameter, an inner edge defining an inner diameter, an upper surface, and a lower surface;
    a cylindrical guide member depending axially from said bearing plate and having upper and lower edges, an inner surface defining an inner diameter, and an outer surface defining an outer diameter; and
    a plurality of securing bolts having threaded shafts extending upward from said securing bolt peripheral portion of said upper attachment plate;
    said lift spacer having an inner diameter such as to axially receive an axially mounted shock absorber;
    said upper attachment plate outer diameter being such as to fit within a coil receiver of the vehicle coil suspension;
    said bearing plate having an outer diameter such that said vehicle spacer rests on the coil of the vehicle coil suspension;
    said cylindrical guide member having an outer diameter and a vertical length such as to axially fit within the coil spring of the vehicle coil spring and maintain said lift spacer in alignment with the coil spring.

2. The lift spacer of claim 1, wherein said plurality of securing bolts consists of three securing bolts.

3. The lift spacer of claim 2, said securing bolt peripheral portion of said upper attachment plate defining three equally spaced throughbores for receiving said securing bolts.

4. The lift spacer of claim 3, said securing bolts having heads and threaded shafts, said shafts being inserted upwardly through corresponding said throughbores.

5. The lift spacer of claim 4, said securing bolt heads being welded to said lower surface of upper attachment plate.

6. The lift spacer of claim 5, said securing bolts having securing nuts and washers, said shafts of said bolts being of sufficient length as to extend through the upper spring receiver and the shock tower mounts of the suspension and be secured by said securing nuts and washers.

7. The lift spacer of claim 1, wherein said upper edge of said lift member is welded to said lower surface of said upper attachment plate.

8. The lift spacer of claim 7, wherein said inner diameter of said lift member is greater than said inner diameter of said upper attachment plate and said lift member is welded to said upper attachment plate along the respective upper inner and outer surfaces of said lift member at said upper edge thereof.

9. The lift spacer of claim 8, wherein said inner diameter of said bearing plate is less than the inner diameter of said lift member and said lift member is welded to said upper surface of said bearing plate along the lower inner surface of said lift member at said lower edge thereof.

10. The lift spacer of claim 9, wherein said inner diameter of said guide member is less than the inner diameter of said lift member and said guide member is welded to said lower surface of said bearing plate along the upper inner surface of said guide member at said upper edge thereof.

11. The lift spacer of claim 1, wherein the amount of lift imparted to said suspension by said vehicle suspension lift spacer is selectable by selecting a desired length between said upper and lower edges for said lift member.

12. A generally cylindrical lift spacer for a vehicle coil suspension, comprising:
    an upper attachment plate configured as a flat ring defining a central axis and having an outer edge defining an outer diameter, an inner edge defining an inner diameter, an upper surface, a lower surface and a securing bolt peripheral portion;
    a cylindrical lift member depending axially from said upper attachment plate and having upper and lower edges, an inner surface defining an inner diameter, and an outer surface defining an outer diameter spaced inward from said outer edge of said upper attachment plate so as to define a securing bolt peripheral portion of said upper attachment plate;
    a bearing plate depending axially from said cylindrical lift member and configured as a flat ring having an outer edge defining an outer diameter, an inner edge defining an inner diameter, an upper surface, and a lower surface;
    a cylindrical guide member depending axially from said bearing plate and having upper and lower edges, an inner surface defining an inner diameter, and an outer surface defining and outer diameter; and
    three equally spaced securing bolts having threaded shafts extending upward from said securing bolt peripheral portion of said upper attachment plate;
    said securing bolt peripheral portion of said upper attachment plate defining three equally spaced throughbores for receiving said securing bolts;
    said securing bolts having heads and threaded shafts, said shafts being inserted upwardly through corresponding said throughbores;
    said lift spacer having an inner diameter such as to axially receive an axially mounted shock absorber;
    said upper attachment plate outer diameter being such as to fit within a coil receiver of the vehicle coil suspension;
    said bearing plate having an outer diameter such that said vehicle spacer rests on the coil of the vehicle coil suspension;
    said cylindrical guide member having an outer diameter and a vertical length such as to axially fit within the coil spring of the vehicle coil spring and maintain said lift spacer in alignment with the coil spring.

13. The lift spacer of claim 12, said securing bolt heads being welded to said lower surface of upper attachment plate.

14. The lift spacer of claim 12, said securing bolts having securing nuts and washers, said shafts of said bolts being of sufficient length as to extend through the upper spring receiver and the shock tower mounts of the suspension and be secured by said securing nuts and washers.

15. The lift spacer of claim 12, wherein the amount of lift imparted to said suspension by said vehicle suspension lift spacer is selectable by selecting a desired length for said lift member.

16. The lift spacer of claim 12, wherein each of said upper attachment plate and said bearing plate has a thickness of about ¼ inches, their respective diameters are about 6½ inches, and their inner diameters are about 3 to about 3½ inches.

17. The lift spacer of claim 16, wherein said guide member is about 1⅜ inches in length, having a wall about ⅛ inch in thickness and an inner diameter of at least 3 inches.

18. The lift spacer of claim 17, wherein said lift member has a wall about 3/16 inches in thickness.

19. A method of making a generally cylindrical lift spacer for a vehicle coil suspension, comprising the steps of:

cutting a flat ring from flat metal stock to form an upper attachment plate;

drilling three equally spaced throughbores proximate the perimeter of said attachment plate;

cutting a flat ring from flat metal stock to form a bearing plate;

cutting a cylindrical segment from cylindrical metal stock to form a lift member;

cutting a cylindrical segment from cylindrical metal stock to form a guide member;

axially aligning said lift member on said attachment plate and welding said lift member to said attachment plate;

axially aligning said bearing plate on said lift member and welding said bearing plate to said lift member;

axially aligning said guide member on said bearing plate and welding said guide member to said lift member; and inserting three securing bolts upward through respective said throughbores defined by said attachment plate and welding the heads of said securing bolts to said attachment plate.

* * * * *